May 4, 1937.　　　T. A. ABBOTT　　　2,078,920
METER CASING
Filed Jan. 17, 1936
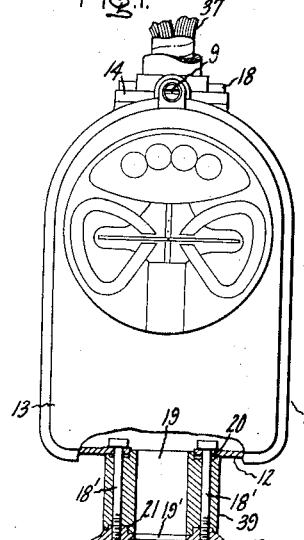
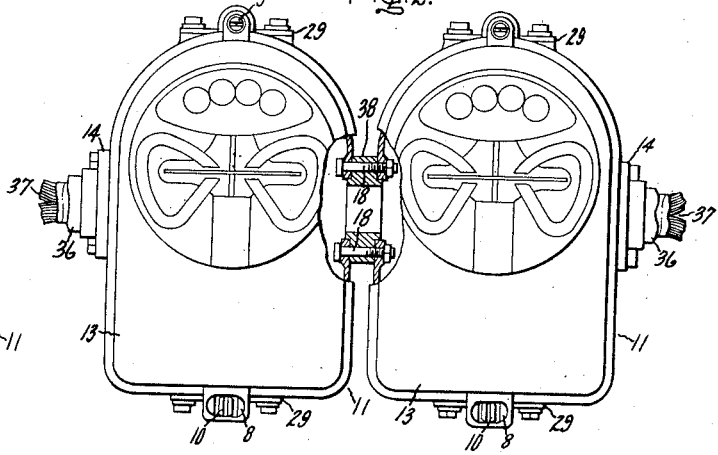
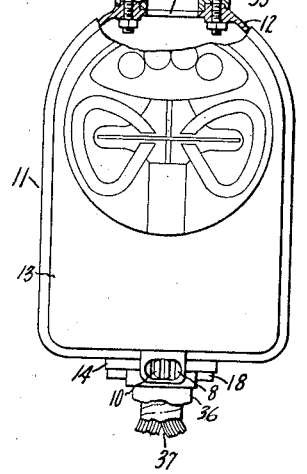
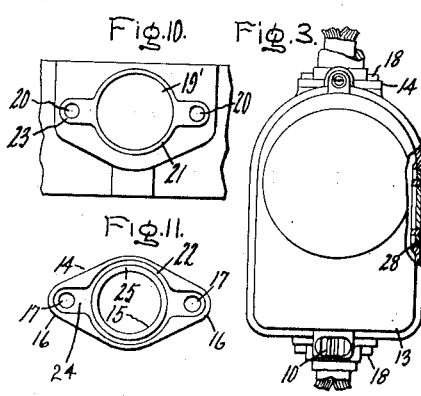
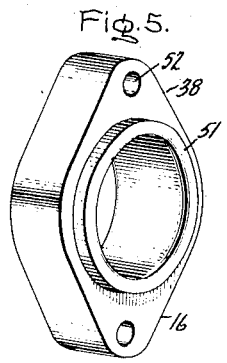
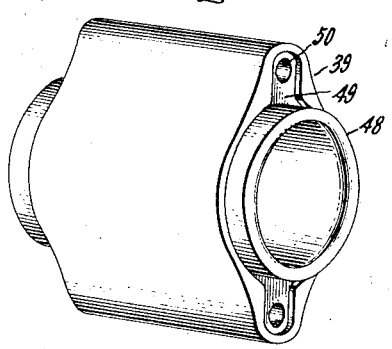
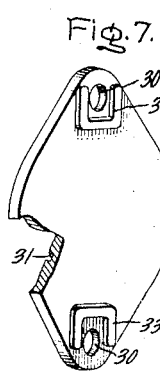
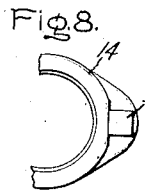
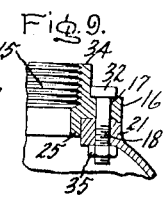
Inventor:
Thomas A. Abbott,
by Harry E. Dunham
His Attorney.

Patented May 4, 1937

2,078,920

UNITED STATES PATENT OFFICE 2,078,920

METER CASING

Thomas A. Abbott, Marblehead, Mass., assignor to General Electric Company, a corporation of New York Application January 17, 1936, Serial No. 59,594

5 Claims. (Cl. 247—2)

My invention relates to casings for electrical devices and concerns particularly electric meter casings.

It is an object of my invention to provide an arrangement for removably attaching a casing for an electrical device to conductor-protective conduit in such a way that the joints are weatherproof and tamperproof.

It is also an object of my invention to provide a casing in which conductors may be led into the casing through conduit from one or more directions and which may be adapted for various sizes of conduit.

It is another object of my invention to provide an arrangement for compactly ganging a number of meter casings on a panel or wall.

Other and further objects and advantages will become apparent as the description proceeds.

In carrying out my invention in its preferred form, I provide a casing of a suitable type for the electrical device to be enclosed and removable nipples for receiving electrical conduit. The casing comprises a box and a cover which may be sealed thereto. To guard against any one's tampering with the device in the casing or with the wiring, I provide such a fastening arrangement for the removable nipples that they can be unfastened only from the inside of the casing by breaking the seal and removing the cover. Where desirable to guard against water seeping into the casing, I provide a rabbeted joint between the casing and the removable nipple.

The invention will be understood more readily from the following detailed description when considered in connection with the accompanying drawing and those features of the invention which are believed to be novel and patentable will be pointed out in the claims appended hereto. In the drawing, Fig. 1 represents one embodiment of my invention in which meter casings are ganged vertically and electrical conductors enter the casings at the top and bottom; Fig. 2 represents an arrangement for ganging meters horizontally in which electrical conductors enter the casings at the sides; Fig. 3 illustrates a meter casing with a portion broken away to show the break-out arrangement which permits attaching conduit to the sides of a meter originally having smooth sides without openings; Fig. 4 illustrates a meter casing with a portion broken away to show the method of attaching covers to certain conduit-receiving openings of the casing when it is no longer desired to bring conductors through these openings and Fig. 4 illustrates also the method of making these covers irremovable from the outside of the casing; Fig. 5 is a perspective view of a fitting provided for ganging meter cases horizontally; Fig. 6 is a perspective view of a fitting for ganging meter casings vertically; Fig. 7 is a perspective view with a portion broken away of a cover used for closing conductor-receiving openings when it is no longer desired to use such openings; Figs. 8 and 9 are fragmentary plan and sectional views, respectively, of one of the removable nipples, showing the method of making it irremovable from the outside of the meter casing; Fig. 10 is a fragmentary top view of the meter casing; and Fig. 11 is a plan view of a conduit-receiving nipple seen from the side placed against the meter casing.

In the drawing, like reference characters are utilized to designate like parts throughout. The invention is illustrated as being adapted to protective enclosing casings for watt-hour meters but it will be understood that the invention is not limited to casings for any particular type of device.

Meter casings 11 are shown comprising meter-receiving boxes 12 with openings for receiving the meter adapted to be closed by covers 13. The boxes 12 and covers 13 are suitably fastened and are provided with suitable sealing arrangements for preventing unauthorized persons from removing the covers 13 without breaking a seal and leaving some indication that the apparatus has been tampered with. For example, screws 9 and 10 may be provided for fastening the covers 13 to the boxes 12 and, if desired, the screws 10 may be sealed by snapping glass sealing caps over the heads of the screws 10 in the recesses 8 in the ends of the cover 13. Such a sealing arrangement and the arrangement of meters in the casings do not constitute a part of my present invention but are described more in detail in my United States Patent No. 1,965,329 and are illustrated in Design Patent No. 94,322 to Bakke.

In order that the meter casings 11 may be adapted for receiving conductor-protective conduit of various sizes and in order that conductor-receiving openings may be closed when no longer needed, I provide removable conduit-receiving or conductor-receiving nipples 14. The nipples 14 have annular projections in which the openings 15 are threaded and are of suitable size to receive threaded conduit of the size desired containing electrical conductors. The nipples 14 also have wings 16 containing bolt holes 17 to receive bolts 18 for attaching the removable nipples to the walls of the meter-receiving boxes 12. It will be understood that the boxes 12 also have conductor-receiving openings 19 and 19' and bolt holes 20 adapted to register with the corresponding openings of the removable nipples 14.

To guard against the seepage of water into the casing 11, the conductor-receiving openings 19', particularly those at the tops of the meter boxes 12 are provided with raised lips or rims 21 around the edges of the openings 19'. The removable nipples 14 are correspondingly rabbeted at 22 in order to form overlapping joints dispelling any water from the connection between the removable nipples and the top openings of the box. I have found that water may be dispelled also from the bolt holes 20 by extending the rims 21 at 23 so as to surround the bolt holes 20 (Fig. 10). Corresponding extensions 24 in the rabbets 22 of the removable nipples 14 are also provided (Fig. 11). Preferably the nipples 14 also have annular projections 25 (Figs. 9 and 11) fitting into the openings 19 and 19' in order that the nipple at the bottom of the casing will also shed water and prevent seepage into the conduit fastened to the bottom of the casing.

Ordinarily, the boxes 12 are provided with conduit-receiving openings 19 and 19' at the bottom and top and without openings at the sides. However, the construction is such that conduit-receiving nipples may also be attached at the sides when desired. As shown in Fig. 3, the side walls of the box 12 are suitably reenforced by the ribs 26 so that conductor-receiving openings 27 and bolt holes 28 may be made in the side walls of the boxes and they will be of sufficient strength to have conduit attached thereto. If desired, the boxes may be left with integral sides and the openings 27 and 28 may be drilled out when desired. However, I find it convenient to weaken the portions of the material around the edges of the location of the prospective openings 27 and 28 so that these portions serve as break-outs which may readily be knocked out or, if desired, I may drill out these openings and stop up the openings with plugs or disks which are forced in under considerable pressure and may be knocked out from the inside of the box but are not perceptible from the outside and cannot be removed from the outside so that there is no danger of unauthorized persons gaining access to the interior of the casings 11. When the conduit-receiving openings and bolt holes have been made at the sides of the boxes 12, removable nipples 14 may be attached to the sides, as shown in Fig. 4. Although the casings 11 are described as originally having top and bottom openings 19' and 19, it will be understood that the break-out or knock-out arrangement may be provided at the top and bottom also, as well as at the sides.

If desired, conduit may be led into the casings 12 from top, bottom, and sides. However, if it is desired to close the top and bottom openings 19' and 19 when the side openings are used, covers 29 of the type shown in Fig. 7 may be placed over the unused openings. The covers 29 have bolt holes 30 corresponding to the bolt holes 17 in the nipples 14 and are provided with grooves or rabbets 31 corresponding to the rabbets 22 in the nipples 14. A waterproof joint may, therefore, be provided even after a conduit is no longer used.

In order to guard against the nipples 14 or the covers 29 being removed by unauthorized persons so as to tamper with the meter inside or with the wiring, I provide the bolts 18 with heads 32 which are noncircular or of such shape that they cannot be turned. For example, the heads 32 may be square and the covers 29 may be provided with ridges 33 forming a square enclosure engaging the square heads 32 to prevent them from turning, and the bolt holes 17 of the wings 16 of the nipples 14 may be brought so close to the annular conduit-receiving projections 34 that the heads 32 cannot turn. It will be understood, of course, that the bolts 18 are inserted from the outside so that the heads 32 will be on the outside of the casing and nuts 35 may be applied at the inside ends of the bolts 18. Authorized persons will, of course, be able to screw or unscrew the nuts 35 by removing the covers 13 of the casings but unauthorized persons will not be able to do so without breaking the seals on the screws 10 of the covers 13.

The nipples 14 are illustrated as receiving rigid conduit 36 for protecting electrical conductors 37. It will be understood, however, that my invention is not limited to the use of nipples for receiving rigid conduit as flexible conduit may also be employed or the nipples 14 may be of the type illustrated in the copending application of H. F. Crotty, Serial No. 59,581, filed January 17, 1936, and assigned to the same assignee as the present application in which reenforced cable is sealed directly to the nipple.

Casings embodying my invention are well adapted to being mounted in groups compactly so that a large number of meters may be mounted in small space on a panel or wall in apartment houses and other places where many meters must be mounted in a limited space.

In order to preserve the weatherproof and tamperproof features of my meter casings, I provide fittings 38 and 39 for horizontal and vertical ganging, respectively, of meter casings. It will be seen that the fittings 39 are provided at both ends with ridges 48 fitting the conductor-receiving openings 19 and 19' to correspond with the annular projections 25 and with rabbets 49 corresponding to the rabbets 22 in the nipples 14. Bolt holes 50 are also provided, which register with the bolt holes 20 in the boxes 12 so that connections between casings can be made, as shown in Fig. 1, in which the arrangement is such that the covers 13 must be removed in order to loosen the bolts 18' and detach the meter casings or the fittings 39. The fittings 39 are of such length that a convenient clearance is left between the ends of the casings 11 in which the bolts 9 and 10 are received.

For horizontal ganging, the fittings 38 are provided, which are of such thickness as to provide convenient clearance between the lateral edges of the covers 13 and which have ridges 51 fitting the openings 27 and bolt holes 52 registering with the bolt holes 28. The length of the vertical and horizontal fittings, Figs. 6 and 5, may of course be varied as desired.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. An electric meter casing comprising in combination, a meter-receiving box having a conductor-receiving opening, a cover for said box, said box having a ridge around said opening, a conduit-receiving removable nipple, and bolts and nuts for securing said nipple to said box over said conductor-receiving opening, said nipple being rabbeted to fit over said ridge and flat against said box, said nipple having a projecting internally-threaded conduit-receiving annular portion and wings adjacent thereto with bolt holes for receiving said bolts, said box having bolt holes registering therewith, said bolts having non-circular heads of such size as to engage the side of the annular projecting portion of said nipple to prevent turning of said bolts and said nuts being secured on said bolts from the inside of said box, whereby said nipple cannot be removed and access to the interior of said meter casing cannot be gained without removing the cover thereof.

2. A casing for an electrical device comprising in combination, a box having an opening for receiving the device and having a conductor-receiving opening, a cover for said box, a conductor-receiving removable nipple, and bolts and nuts for securing said nipple to said box over said conductor-receiving opening, said nipple having bolt holes for receiving said bolts, said box having bolt holes registering therewith, said bolts having noncircular heads and said nipples having portions adapted for angularly engaging said heads to prevent turning of said bolts, and said nuts being secured on said bolts from the inside of said box, whereby said nipples cannot be removed and access to the interior of said casing cannot be gained without removing the cover thereof.

3. In combination, an electrical-device casing having a conductor-receiving opening, a conductor-receiving removable nipple, and bolts and nuts for securing said nipple to said casing over said conductor-receiving opening, said nipple having bolt holes for receiving said bolts, said casing having bolt holes registering therewith, said bolts having noncircular heads and said nipple having portions adapted for angularly engaging said heads to prevent turning of said bolts, and said nuts being secured on said bolts from the inside of said casing whereby said nipples cannot be removed from the outside of said casing.

4. In combination, an electrical-device casing having a conductor-receiving opening, a cover for closing said conductor-receiving opening, and bolts and nuts for securing said cover to said casing over said conductor-receiving opening, said cover having bolt holes for receiving said bolts, said casing having bolt holes registering therewith, said bolts having noncircular heads and said cover having portions adapted for angularly engaging said heads to prevent turning of said bolts, and said nuts being secured on said bolts from the inside of said casing, whereby said cover cannot be removed from the outside of said casing.

5. In combination, an electrical-device casing having a conductor-receiving opening, a conductor-receiving removable nipple, and bolts for securing said nipple to said casing over said conductor-receiving opening, said nipple having bolt holes for securing said bolts and said casing having bolt holes registering therewith, said casing having a ridge around said conductor-receiving opening extending also around the bolt holes in the casing, and said nipple being rabbeted to fit over and around said ridge and flat against said casing.

THOMAS A. ABBOTT.